Patented Nov. 14, 1939

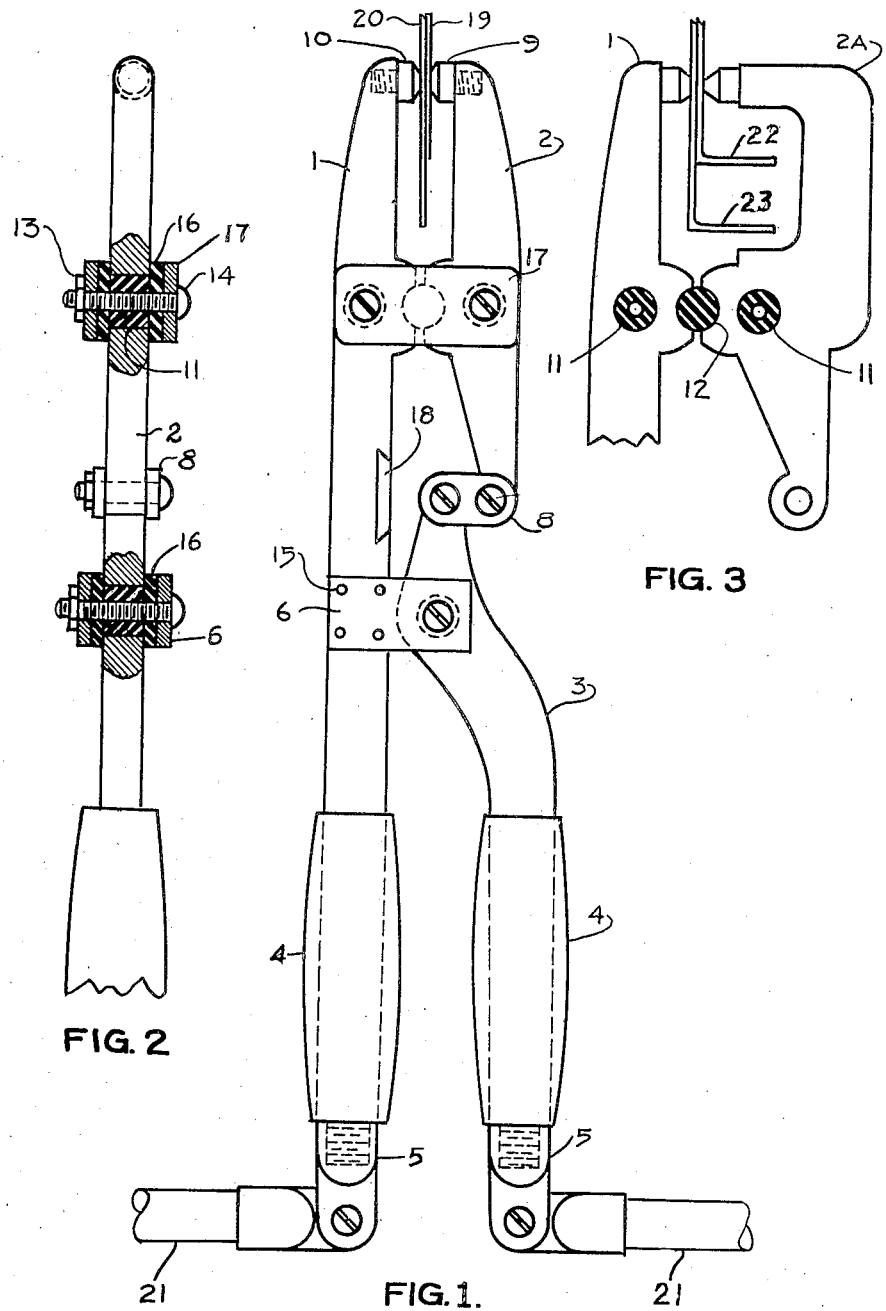

2,179,497

UNITED STATES PATENT OFFICE 2,179,497

SPOT WELDING APPLIANCE

Sergo B. Davitow, St. Albans, N. Y.

Application August 8, 1938, Serial No. 223,686

1 Claim. (Cl. 219—4)

(Granted under the act of March 3, 1883, as amended April 30, 1928; 370 O. G. 757)

This invention relates to a portable spot welding tool and has for an object to provide an improved portable spot welder especially intended for welding flat pieces or sheets of material together, and which will serve to hold such flat pieces or sheet material together under sufficient physical pressure to insure a good weld.

A further object of this invention is to provide a portable spot welder which may be manually applied in operative position, and wherein a compound lever arrangement is present to magnify the pressure of the operator's hand so as to insure a perfect spot weld between the electrode points.

With the foregoing and other objects in view, the invention consists in the construction, combination and arrangement of parts hereinafter described and illustrated in the drawing, in which, Fig. 1 is a side elevational view of the spot welder of this invention.

Fig. 2 is a plan view, partly broken away, of the structure shown in Fig. 1, and Fig. 3 is a side, fragmentary, elevational view showing a modified form of upper electrode.

The spot welder of this invention is similar to a pair of tongs or pliers and comprises a lower electrode 1 and an upper electrode 2, both of which are made of copper. The upper electrode 2 is linked to an upper electrode compound lever 3 by means of two compound lever plates 8 held in mechanical contact therewith by bolts and nuts. The upper electrode 2 and lower electrode 1 are pivoted together about an insulation pivoted block 12 by means of insulation bushings 11 and side plates 17 insulated from the electrodes 1 and 2 by side insulation plates 16, through which extend bolts 14 and nuts 13. The upper electrode compound lever 3 is similarly pivoted to the lower electrode 1 by means of a similar insulation bushing 11 and insulation plates 16 mounted between side plates 6, the side plates 6 being riveted to the lower electrode 1. An insulation block 18 is set in the lower electrode 1 just below the compound lever joint plates 8 to prevent the possibility of any electrical current arcing from the upper electrode to the lower electrode where the lever is being operated.

The ends of the electrodes 1 and 2 are provided with detachable soft copper welding tips 9 and 10 which are placed above and below the sheets 19 and 20 being welded together. The other end of the electrode 1 and the corresponding end of the compound lever 3 are each provided with hardwood turned handles 4, enabling the operator to grasp them separately and be insulated from the current passing therethrough in operation. The extreme ends of the lever 3 and electrode 1 are threaded and receive threaded connecting lugs 5, to which electrical conduits 21 may be connected for bringing an electrical welding current thereto from any suitable source such as a commercial transformer ordinarily used for this purpose.

With the construction shown, a maximum pressure of 300 pounds can be exerted at the electrode points 9 and 10, thus insuring a perfect spot weld between the sheets 19 and 20.

In operation, the operator merely grasps the wooden handles 4 and operates them to separate the electrode points 9 and 10 from each other so that they may pass over the sheets 19 and 20, then moves the handles 4 toward each other, thereby causing the electrode tips 9 and 10 to press the sheets 19 and 20 together with the desired mechanical pressure. The welding current is then turned on for the desired period of time from the transformer and then can be cut off either at the transformer or by separating the welding tips 9 and 10.

If the material to be welded is provided with upstanding flanges 22 and 23, as in welding pans together, the upper electrode may be formed with the bridge 2A, as shown in Fig. 3, the construction and operation of this form being otherwise identical with the first form above described. Additional electrodes with the bridge 2A in appropriate sizes may be provided for particular materials, such electrodes being easily and obviously substitutable for the electrode 2.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

A portable spot welding appliance comprising a pair of handles of different lengths disposed side by side, means for fulcruming the shorter handle on the longer handle intermediate of their ends comprising a pair of insulating side plates secured to said longer handle, a pair of metal side plates secured to said longer handle over said insulating side plates, an insulating bushing pivotally secured between said metal and insulating side plates, said insulating bushing extending through a pivot hole in said shorter handle, the inner end of said shorter handle terminating in an offset extending toward the longer handle, a welding tip carrying jaw integrally extending from said longer handle, a welding tip carrying movable jaw toggle-linked to the offset end of said shorter handle member, and means for fulcruming said movable jaw on said first jaw comprising an offset boss on each jaw extending toward the other jaw, each jaw having a pivoting hole extending therethrough, an insulating bushing in each pivoting hole, said pivoting holes being aligned with each other and said bosses, a pair of insulating side plates and a pair of metal side plates, pivotal means extending through said insulating bushings securing said insulating side plates against the opposite sides of said jaws and said metal side plates against said insulating plates, each said boss having a curved notch, an insulating rod held in said curved notches between said insulating side plates, whereby said handles may exert a heavy mechanical pressure on the welding tips.

SERGO B. DAVITOW.